(12) United States Patent
Parvey

(10) Patent No.: US 8,905,474 B2
(45) Date of Patent: Dec. 9, 2014

(54) MOTORCYCLE BACKREST ASSEMBLY

(71) Applicant: Kuryakyn Holdings, LLC, Somerset, WI (US)

(72) Inventor: Daniel Parvey, New Richmond, WI (US)

(73) Assignee: Kuryakyn Holdings, LLC, Somerset, WI (US)

( * ) Notice: Subject to any disclaimer, the term of this patent is extended or adjusted under 35 U.S.C. 154(b) by 4 days.

(21) Appl. No.: 13/772,525

(22) Filed: Feb. 21, 2013

(65) Prior Publication Data
US 2013/0214569 A1 Aug. 22, 2013

Related U.S. Application Data

(60) Provisional application No. 61/601,319, filed on Feb. 21, 2012.

(51) Int. Cl.
*B62J 1/00* (2006.01)
*B62J 1/28* (2006.01)

(52) U.S. Cl.
CPC ..... *B62J 1/00* (2013.01); *B62J 1/28* (2013.01)
USPC ............ 297/215.13; 297/215.12; 297/215.11; 297/215.14; 297/188.02; 297/188.21

(58) Field of Classification Search
CPC .......................................................... B62J 1/28
USPC ........................................ 297/215.11–215.14
See application file for complete search history.

(56) References Cited

U.S. PATENT DOCUMENTS

| 4,186,937 | A  | * | 2/1980 | Schultz | 280/304.4 |
|---|---|---|---|---|---|
| 6,659,547 | B2 | * | 12/2003 | Petersen | 297/215.1 |
| 6,983,992 | B2 | * | 1/2006 | Oomori | 297/357 |
| 7,077,470 | B1 | * | 7/2006 | Strother | 297/215.12 |
| 7,131,691 | B2 | * | 11/2006 | Ziegler | 297/215.12 |
| 8,500,195 | B2 | * | 8/2013 | Smith, II | 297/215.12 |
| 2008/0084097 | A1 | * | 4/2008 | Botting | 297/215.12 |
| 2013/0093222 | A1 | * | 4/2013 | Young | 297/188.04 |

* cited by examiner

*Primary Examiner* — Laurie Cranmer
(74) *Attorney, Agent, or Firm* — Dicke, Billig & Czaja, PLLC

(57) ABSTRACT

A motorcycle backrest assembly includes a base assembly having first and second ends and a back rest rotatably connected to the first end of the base assembly such that the back rest is movable between first and second positions. A mounting plate has the second end of the base assembly rotatably connected thereto such that the base assembly is movable between first and second positions. The backrest assembly includes a first configuration as a passenger back rest where the backrest is in the first position and the base assembly is in the first position, and a second configuration as a driver backrest where the backrest is in the second position and the base assembly is in the second position.

2 Claims, 4 Drawing Sheets

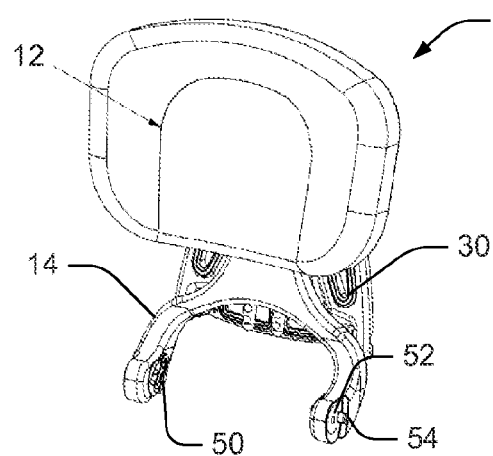
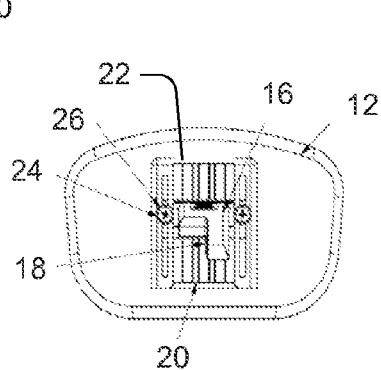
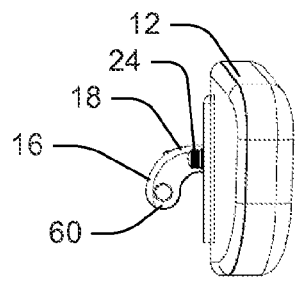
FIG. 1
FIG. 2
FIG. 3
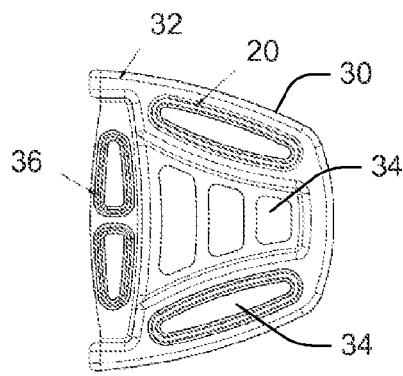
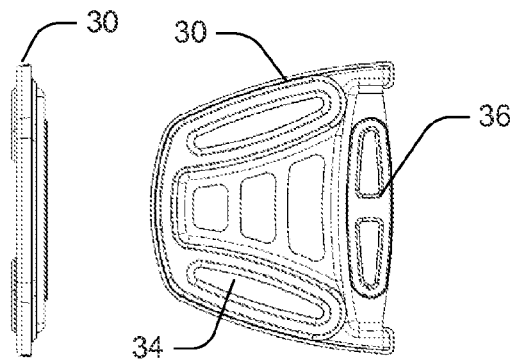
FIG. 4
FIG. 5
FIG. 6
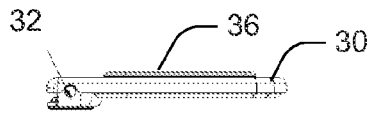
FIG. 7

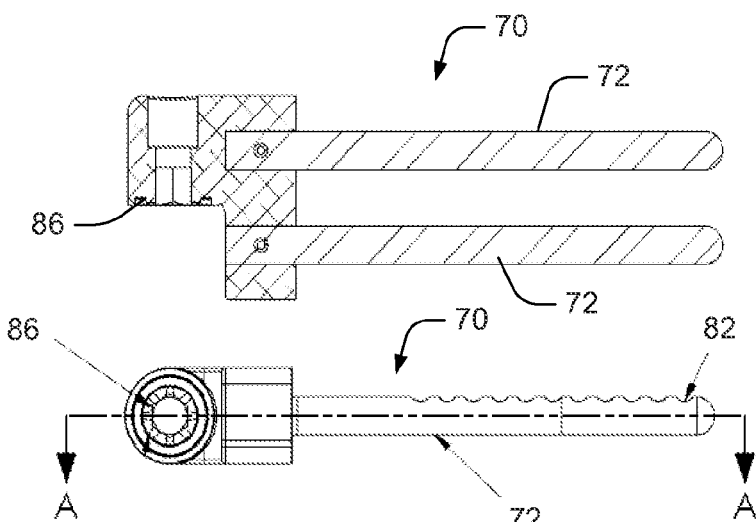
FIG. 20A
FIG. 20
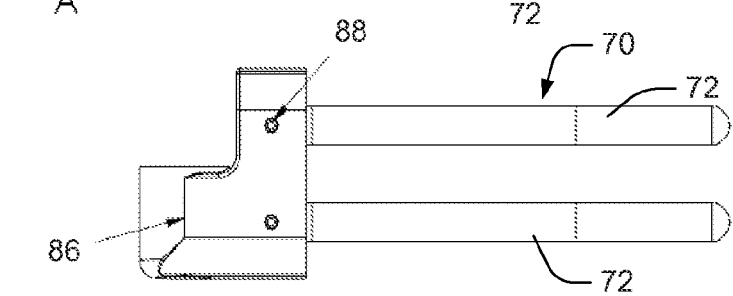
FIG. 18
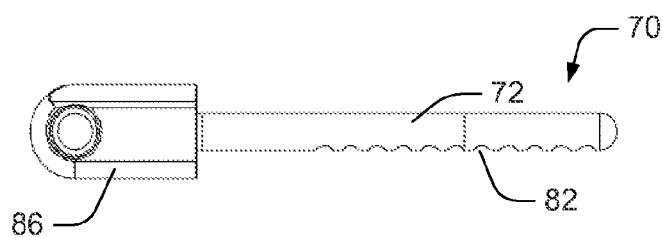
FIG. 19

MOTORCYCLE BACKREST ASSEMBLY

CROSS-REFERENCE TO RELATED APPLICATIONS

This patent application claims priority to U.S. Provisional Application No. 61/601,319, filed Feb. 21, 2012.

BACKGROUND

This disclosure generally relates to custom accessories for a motorcycle. More particularly, this disclosure relates to a motorcycle backrest assembly.

Backrests for motorcycle drivers and passengers have been utilized for increasing rider comfort. A cargo rack is sometimes provided, extending rearward from the back portion of the backrest. Some motorcycle backrests are mounted at the rear of a motorcycle seat in the back fender area of the motorcycle. Being mounted at the rear of the seat, such backrests are typically in position for use by a passenger, rather than the driver.

SUMMARY

In accordance with aspects of the present disclosure, a motorcycle backrest assembly includes a base assembly having first and second ends and a back rest rotatably connected to the first end of the base assembly such that the back rest is movable between first and second positions. A mounting plate has the second end of the base assembly rotatably connected thereto such that the base assembly is movable between first and second positions. The backrest assembly includes a first configuration as a passenger back rest where the backrest is in the first position and the base assembly is in the first position, and a second configuration as a driver backrest where the backrest is in the second position and the base assembly is in the second position.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 is a front perspective view of an example of a disclosed backrest assembly.

FIG. 2 is rear view of an example of the backrest portion of the assembly of FIG. 1.

FIG. 3 is side view of the backrest shown in FIG. 2.

FIG. 4-7 are top, end, bottom and side views, respectively, of an example of the cargo rack shown in the assembly of FIG. 1.

FIG. 18 is a top view of an example of a shaft assembly of the backrest assembly shown in FIG. 1.

FIG. 19 is a side view of the shaft assembly shown in FIG. 18.

FIG. 20 is a side view of the shaft assembly, illustrating the side opposite that shown in FIG. 19.

FIG. 20A is a section view of the shaft assembly taken along line A-A in FIG. 20.

DETAILED DESCRIPTION

Figure 8:
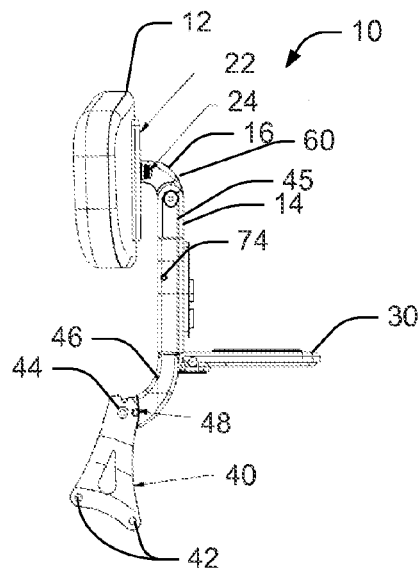
FIGS. 8 and 9 are side and rear views, respectively, of the backrest assembly a first position with the cargo rack pivoted to the down or deployed position.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims FIG. 1 is a front perspective view of an example of a motorcycle backrest assembly 10 in accordance with the present disclosure. The backrest assembly 10 includes a padded backrest 12 and is configured to be mounted to a motorcycle.

FIGS. 2 and 3 are back and side views, respectively, of portions of the assembly 10. The backrest 12 is rotatably and slidably connected to a base assembly 14 via a connecting link 16. The connecting link 16 has a first end 18 that is slidably received by a series of slots 20 in a mounting plate 22 fastened to the back of the backrest 12. The backrest 12 can then be fixed in a desired location by tightening thumb screws 24 on a nut extending through a slot 26, for example. In the illustrated example, one thumb screw 24 and associated slot 26 are situated on either side of the connecting link 16.

The illustrated embodiment of the assembly 10 further includes a cargo rack 30 that is shown in FIG. 1 in an up or stowed position. FIGS. 4-7 are top, end, bottom and side views, respectively, of the cargo rack 30. The cargo rack 30 is pivotally connected to the base assembly 14 such that it can be moved about a pivot point 32. Thus, the cargo rack 30 can be positioned in a first stowed position wherein it is folded up, as illustrated in FIG. 1, or in a second position where it is folded down and deployed for carrying cargo. The illustrated example of the cargo rack 30 includes a plurality of holes 34, with some of the holes fitted with rubber boots 36.

The backrest assembly 10 is positionable such that the backrest 12 is situated in a first configuration towards the back of the motorcycle for use by a passenger, or alternatively in a second configuration towards the front of the motorcycle for use by the driver. Further, as discussed more below, the backrest assembly can be situated in the first or the second configuration as desired without the need for tools.

Figure 9:
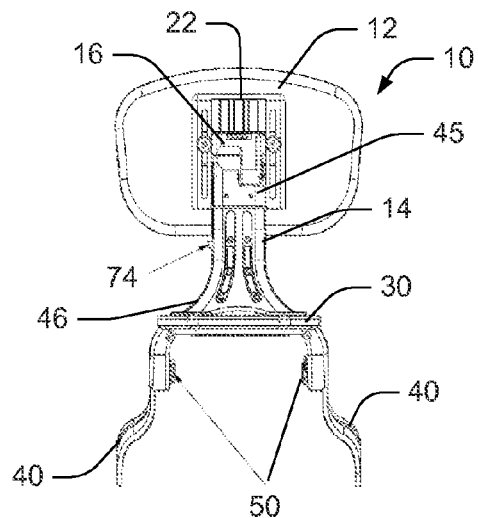
Figure 10:
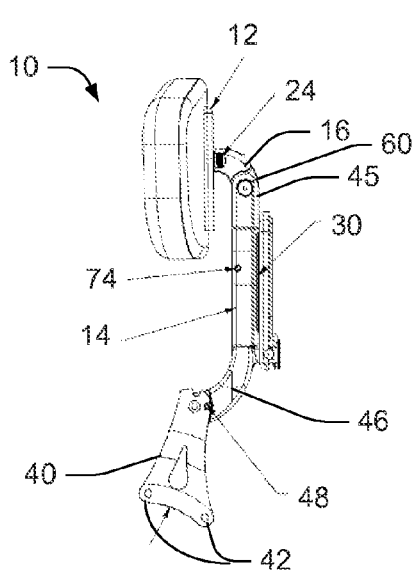
FIGS. 10 and 11 are side and rear views, respectively, of the backrest assembly in the first position with the cargo rack pivoted up to the stowed position
Figure 11:
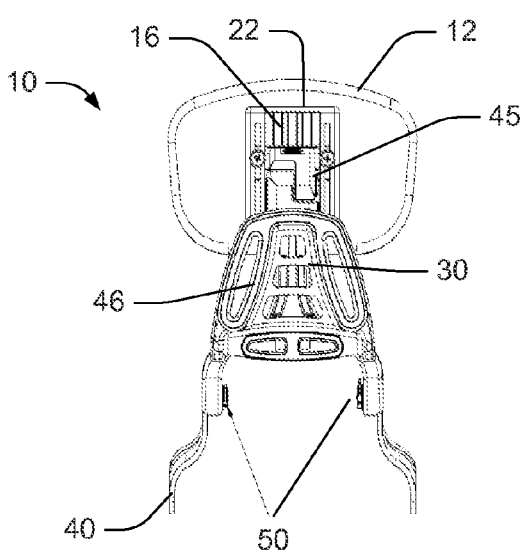

FIGS. 8-11 illustrate various aspects the backrest assembly 10 in the first configuration for use as a passenger backrest. FIGS. 8 and 9 are side and rear views, respectively, of the backrest assembly 10 in the first position with the cargo rack 30 pivoted to the down or deployed position. FIGS. 10 and 11 are side and rear views, respectively, of the backrest assembly in the first position with the cargo rack 30 pivoted up to the stowed position. A pair of mounting plates 40 are provided for attaching the base assembly 14 to a rear support structure of a motorcycle (e.g., the rear fender struts). The mounting plates 40 each have two holes 42 through the bottom portion thereof for attachment to the motorcycle. Another hole 44 extends through the upper part of the mount 4, to which a second end 46 of the base assembly 16 is pivotally attached so that the base assembly can be moved between a first position as illustrated in FIGS. 8-11 where the base assembly extends generally vertically, and a second position (discussed further herein below) where the base assembly is oriented generally horizontally. Lock pins 48 fix the base assembly 14 in the desired position. A pair of lock pin cams 50 are situated proximate the lock pins 48, which can be rotated to hold both lock pins 48 in an "open" position, allowing the base assembly 14 to be rotated to the desired position, then rotated back to allow the lock pins 48 to lock the base assembly 14 in place.

Figure 12:
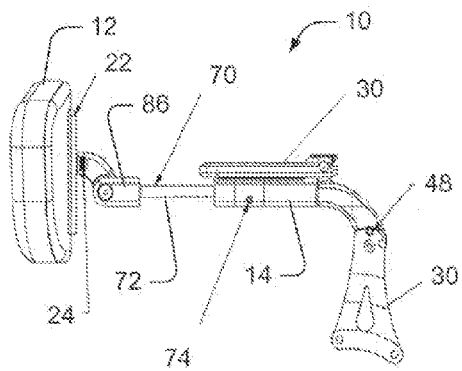
FIGS. 12 and 13 are side and back views, respectively, of the backrest assembly in a second configuration for use as a driver backrest.
Figure 13:
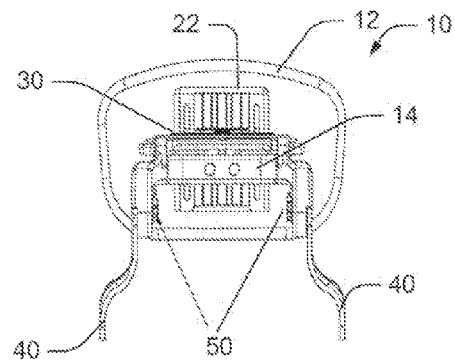

FIGS. 12 and 13 are side and back views, respectively, illustrating the backrest assembly 10 in the second configuration for use as a driver backrest. To move the backrest assembly from first configuration illustrated in FIGS. 8-11, a user rotates the lock pin cams 50 to unseat the locking pins 48, allowing the base assembly 16 to rotate. The user can then rotate the base assembly 14 from the first position where it is in an upright, generally vertical orientation (FIG. 8), to the second position in which it is in a generally horizontal orientation (FIG. 12). The lock pin cams 50 are then rotated, allowing the lock pins 48 to seat and lock the base assembly in place.

The connecting link 16 has a second end 60 that is rotatably connected to the first end 45 of the base assembly, allowing the backrest 12 to be moved between the first position illustrated in FIGS. 8-11, to the second position illustrated in FIGS. 12 and 13. Thus, in the first configuration of the backrest assembly for use as a passenger back rest, the backrest 12 is situated in the first position such that it is generally vertical, or parallel to the base assembly 14. In the second configuration illustrated in FIGS. 12 and 13, the backrest 12 is situated in the second position where it is again in a vertical position to support a driver's back, but now it is generally perpendicular to the horizontally extending base assembly 14.

Figure 14:
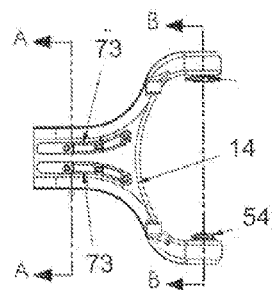
FIG. 14 is a top view of an example of the base assembly of the backrest assembly shown in FIG. 1.
Figure 15:
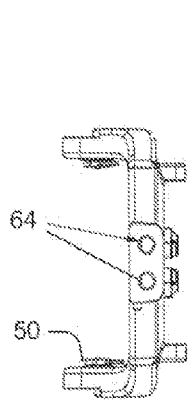
FIG. 15 is a bottom view of the base assembly shown in FIG. 14.
Figure 16:
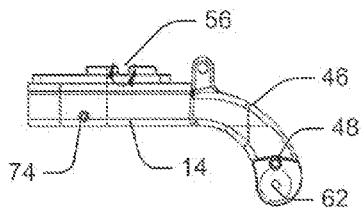
FIG. 16 is a side view of the base assembly shown in FIG. 14.
Figure 17:
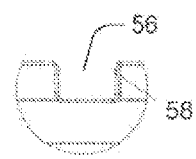
FIG. 17 is a close up view of a notch and undercut of the base assembly shown in FIG. 14.

FIGS. 14-16 illustrate various aspects of an embodiment of the base assembly 14. The second end 46 of the base assembly 14 includes a hole 62, with a pin or bolt extending through the hole 62 and the hole 44 in the mounting plate 40 such that the base assembly 14 is rotatable relative to the mounting plates 40. Two lock pins 48 are situated in respective bores 52 extending through each leg of the second end 46 of the base assembly 14. In certain embodiments, the lock pins 48 are stepped pins and are spring loaded with a compression spring 54. The base assembly 14 includes a notch 56 including an undercut 58 to receive and lock the cargo rack 30 in place when in the stowed position. A close up view of the notch 56 and undercut 58 are shown in FIG. 17.

The first end 45 of the base assembly has two holes extending therein each containing a shaft bushing 64. The shaft bushings 64 are best seen in the bottom view of FIG. 15. Stop pads 73 are situated adjacent the shaft bushings 64 to limit movement of the shafts 72.

Referring now to FIGS. 18-20, a shaft assembly 70 is illustrated. The illustrated implementation of the shaft assembly 70 includes two shafts 72 that are received by the shaft bushings 64 for lateral, telescoping movement therein. The slidable shafts 72 allow positioning the backrest 12 relative to the second end 46 of the base assembly 14. Thus, when the backrest assembly 10 is in the first configuration illustrated in FIGS. 8-11, the backrest 12 can be moved up or down via the shafts 72 to adjust the height of the backrest 12 for a passenger's comfort. When in the second configuration as illustrated in FIGS. 12-13, the backrest 12 can be moved laterally relative to the second end 46 of the base assembly to position the backrest 12 as desired for the motorcycle driver.

Figures 14A, 14B:
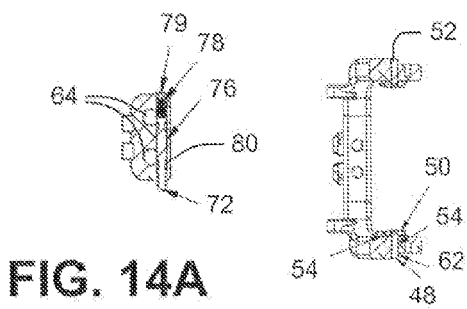
FIG. 14A is a section view of the base assembly taken along line A-A of FIG. 14.
FIG. 14B is a section view of the base assembly taken along line B-B of FIG. 14.

FIG. 14A illustrates a lock pin 74 situated in a bore 76 extending through the base assembly 14. A compression spring 78 spring loads the lock pin 74 and is fixed in place by a set screw 79. Referring now to FIGS. 19 and 20, the shafts 72 each include a series of notches 82 along one side. The lock pin 74 seats in the desired notches 82 to lock the shafts 72 in place. To move the shafts 72, and thus the backrest 12 laterally, the lock pin 74 is activated so that areas of reduced diameter 80 are positioned over the shafts 72, allowing the shafts 72 to slide. When the lock pin 74 is returned to its initial position, the reduced diameter portions 80 of the lock pin 74 are moved relative to the shafts 72 so that the full diameter of the lock pin 74 is positioned over the shafts 72. The lock pin 74 then engages the notches 82 in the shafts 72 to lock it them in place.

As illustrated in FIGS. 18 and 20A, the shafts 72 connect to a pivot end 86 via a spring pin 88. The pivot end 86 rotatably receives the second end 60 of the connecting link. In this manner, the backrest 12 is rotatable relative to the base assembly 14 for positioning the backrest 12 in the first or second position as desired.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A motorcycle backrest assembly, comprising:
a base assembly having first and second ends;
a back rest rotatably connected to the first end of the base assembly such that the back rest is movable between first and second positions;
a mounting plate having the second end of the base assembly rotatably connected thereto such that the base assembly is movable between first and second positions;
a cargo rack pivotally connected to the base assembly between the first and second ends, the cargo rack being movable between a first position and a second position;
wherein the backrest assembly includes a first configuration as a passenger back rest where the backrest is in the first position and the base assembly is in the first position and the cargo rack is in the first position, and wherein the backrest assembly includes a second configuration as a driver backrest where the backrest is in the second position and the base assembly is in the second position and the cargo rack is in the second position.

2. The motorcycle backrest assembly of claim 1, wherein the base assembly includes a shaft, the shaft having a first portion and a second portion, the first portion of the shaft forming the first end of the base assembly, the second portion of the shaft being slidably connected to the base assembly.

* * * * *